Nov. 19, 1963
W. TELLEFSON
3,111,215
EGG CONVEYOR
Filed Aug. 29, 1960
2 Sheets-Sheet 2
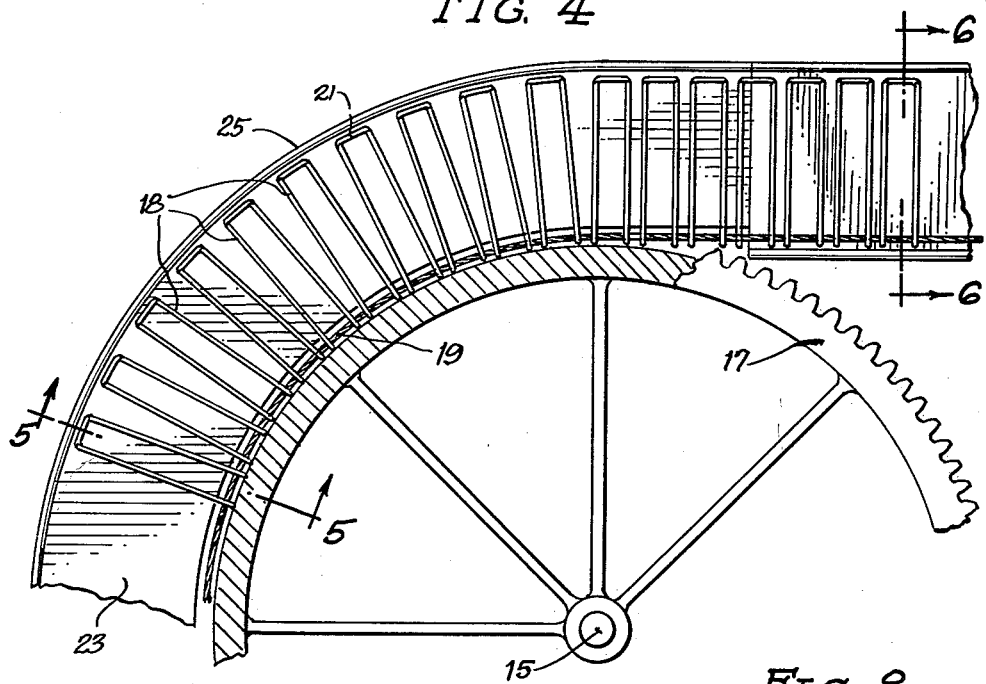
FIG. 4
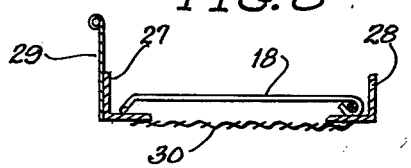
FIG. 8
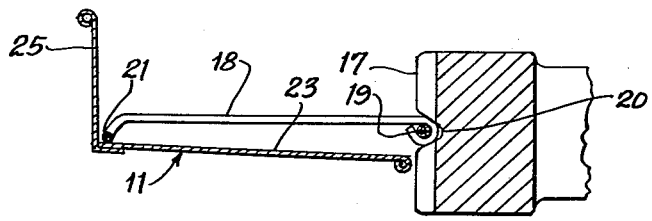
FIG. 5
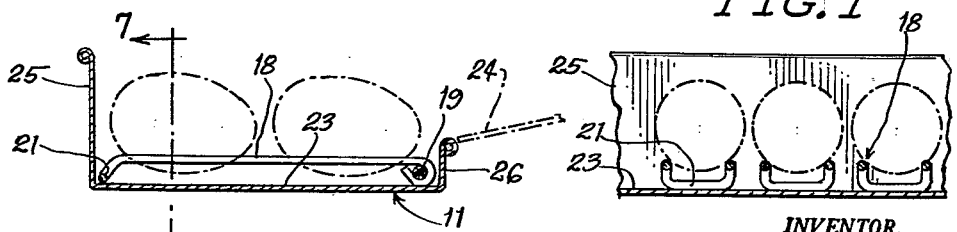
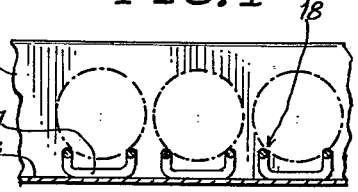
FIG. 7
FIG. 6
INVENTOR.
Willis Tellefson
BY
J. Warren McCaffrey
Attorney

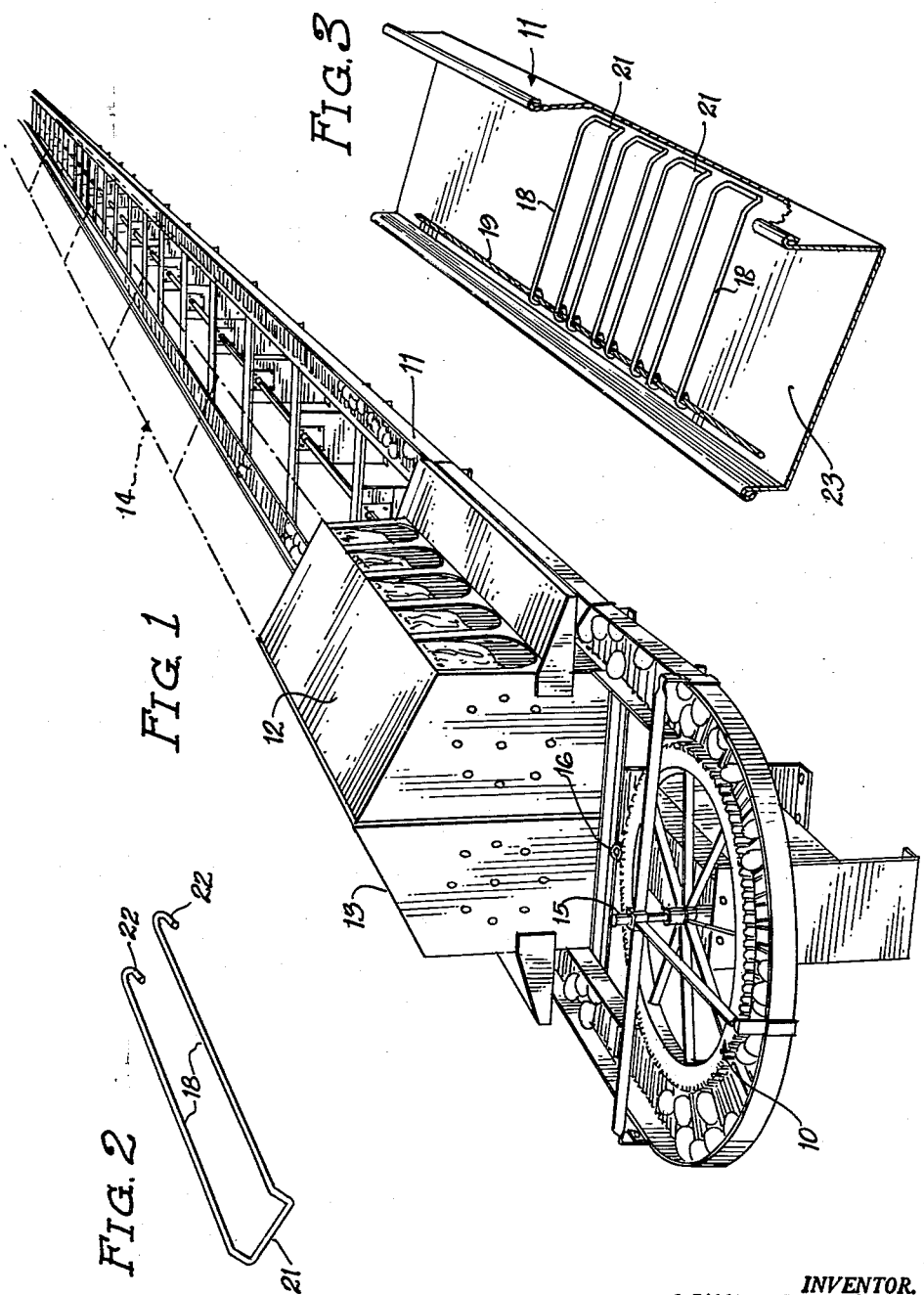

United States Patent Office 3,111,215
Patented Nov. 19, 1963

3,111,215
EGG CONVEYOR
Willis Tellefson, Leland, Ill., assignor to A. R. Wood Manufacturing Company, Luverne, Minn., a corporation of Minnesota
Filed Aug. 29, 1960, Ser. No. 52,467
5 Claims. (Cl. 198—131)

This invention relates to improvements in the handling of freshly laid eggs.

The apparatus of this invention may be used in connection with multiple nests wherein chickens or other fowl lay their eggs. It is particularly adaptable to my multiple egg trap nest described and covered by my U.S. Patent No. 2,695,006.

The object of this invention is to provide a means for removing fresh eggs from the egg-collecting compartment of my aforesaid multiple egg trap nest, which was designed to remove freshly laid eggs from the reach of fowl that laid the eggs so as to prevent breakage and soiling of such eggs.

The apparatus is equally adaptable to other laying nests arranged in rows at the same level for moving the freshly laid eggs from the front of said nests and carrying them to other areas either for sizing, washing, candling, sorting, storage, packing, etc.

The apparatus of this invention is an egg conveyor that may be extended to any length so as to pass in front of any number of nests and also to reach any point of delivery of said eggs. Like most conveyors it preferably moves along at the same level although it is within the scope of the invention to move along in a trough at a slight incline or decline from the horizontal.

In a specific embodiment the egg conveyor of this invention may comprise a trough having straight and rounded sections, wherein the straight sections extend across the front of rows of laying nests and the rounded semi-circular sections extend around a circular driving means at either or both ends of the conveyor, a continuous wire rope lying inside the inner wall of said trough sections, a series of metal fingers fixedly attached to said wire rope at regular intervals, said metal fingers having two hooked ends before being clinched to said wire rope so as to hook over and onto said rope, and also having a depressed length at the end opposite said two hooked ends for sliding along inside the outer wall of said trough while elevated slightly off the floor of said trough.

Another object of this invention is to devise a method and means for gathering and collecting eggs and conveying them to points away from the laying nests for various operations usually performed on freshly laid eggs.

The special feature of the invention is the movement at will of a series of metal, plastic or rubber fingers, called flights, along a trough, which flights are fixedly attached to a wire rope passing along the inside wall of said trough under the motivation of a wheel at one or both ends of said conveyor, which wheel may be geared to a drive pinion or otherwise caused to revolve.

These and other objects and features of this invention will be more apparent from a detailed description of the features and novel arrangement of parts in conjunction with the accompanying drawings in which like reference characters in the several figures refer to the same item.

FIG. 1 is an isomeric view of the egg conveyor passing in front of two multiple sections of laying nests arranged back to back inside the loop of the conveyor and shows the motivating means of the foreground also inside the loop of the conveyor.

FIG. 2 is an isometric view of one of the metal fingers or flights for carrying the eggs along in the trough, which shows the construction of such flight before it is attached to the wire rope and set down inside the trough of the conveyor.

FIG. 3 is an isometric view showing several flights fixedly attached to the wire rope and as they lie in a straight section of the trough of the conveyor.

FIG. 4 is an enlarged, plan view of a section of the wheel that moves the wire rope and attached flights along in the trough of the conveyor, here shown moving in the last half of the semicircular curved section of said trough.

FIG. 5 is a vertical sectional view along 5—5 of FIG. 4 which shows the side of a finger clinched to the wire rope with the outer end sliding along in the curved section of the trough and the end clinched to the wire rope wedged into a groove cut in the teeth of the gear wheel of FIG. 4.

FIG. 6 is a vertical sectional view along 6—6 of FIG. 4 which shows the near side of a finger sliding along in the straight section of the trough in front of a chute for delivering eggs from the nests and showing two eggs riding on a flight, or pair of fingers.

FIG. 7 is a vertical sectional view along 7—7 of FIG. 6 showing some eggs riding on successive flights in the trough of the conveyor.

FIG. 8 is an alternative construction for the conveyor of this invention shown in vertical sectional view for easier understanding.

Referring to the various drawings in detail, FIG. 1 shows the details of the assembly of the egg conveyor around a driving mechanism 10 in the foreground for moving the conveyor along an extended trough 11 which passes in front of multiple nests 12 and 13 which are arranged back to back. The dotted outline 14 extending from the nests to the rear of the conveyor are to indicate the locations of other multiple nests although not shown arranged in two single rows within the two straight sections of the conveyor 11. Only one tier of multiple nests are shown so the conveyor is shown in a single level trough 11. It is possible that another row of multiple nests on top of those shown in FIG. 1 could have its conveyor at a higher level and above the one shown. The operation of the two such conveyors could be simultaneous off the same axle 15 driven by the single drive pinion 16 or the drive pinion 16 could be extended so that the second higher gear wheel (not shown) would have its own driving pinion. It is also possible that by a clutch mechanism, or other like-purpose mechanism not shown, that one conveyor could be operated while the other level conveyor was standing still.

FIG. 4 is an enlarged sectional drawing of some of the mechanism 10 for moving the conveyor in this invention. A gear wheel 17 rotates around axle 15 by means of a driving pinion 16 shown only in FIG. 1. The gear 17 is shown with teeth in a section that mesh with the teeth of the pinion 16.

In FIG. 5 which is an elevation view of the gear along the line 5—5 of FIG. 4, a finger 18 secured to a wire rope or cable 19 and made to move along the curved section of trough 11 is represented in a groove 20. Instead of using a gear wheel 17 with teeth to engage a pinion gear 16, and with central grooves 20 cut in each of the gear teeth, it is within the scope of this invention to employ a grooved rubber rim pulley driven through axle shaft 15 instead of by the rim which would lessen the amount of noise of the driving mechanism. The grooves 20 are necessary so as to provide a squeeze-grip on the wire rope 19 enabling the wheel to move the rope along its straight and curved passageway, that could also be inclined upward or declined down at slight angles.

FIG. 2 shows a pair of fingers 18 that are joined at one end by crosspiece 21 and at the other end have open hooks 22. The inventor calls a pair of fingers as shown a flight. The hooked ends are clamped around a wire rope or cable which runs under the curved down fingers. This method of connecting a pair of fingers to the wire rope is very important because it is important to keep the fingers up above the floor 23 of trough 11. This is accomplished by the depressed cross-piece 21 which joins fingers 18 at the bent-down ends and the wire rope at the other ends of fingers so that the entire egg flight is raised above the floor 23 of trough 11, which fact is clearly shown in FIG. 6.

In FIG. 3 the assembled conveyor consisting of multiple flights attached to a wire rope is shown as it moves along in a straight section of the trough 11 with the outside rim or side of the trough broken away so as to show how the flights ride along in the trough on their depressed ends joined by cross pieces 21.

In FIG. 5 the circular section of trough 11 is shown with only an outside retaining wall. The inside wall of trough 11 is not continued around the metal gear wheel or rubber rim pulley at the curved ends of the egg conveyor because the wire rope 19 has to be pinched into grooves 20 in the gear or pulley that moves the wire rope 19 and numerous flights along and around in the trough.

FIG. 6 shows the near finger 18 of an egg flight riding along the straight section of trough 11 in front of a series of egg chutes 24 with two eggs riding in the flight. This view is perhaps the best illustration of a cross-section of trough 11 showing how the eggs are carried in flight, that is up off the bottom 23 of the trough 11, and prevented from rolling and bumping around while moving continuously in the trough. The construction cuts down the noise of bumping eggs, breakage, and also keeps them up off the dirt and dust that will accumulate in a trough in a chicken house.

FIG. 7 is a vertical-sectional view along line 7—7 of FIG. 6 and shows three eggs riding in three successive flights of the egg conveyor with the outer retaining wall 25 as background. The outside wall 25 is preferably taller than the inside wall 26 because the eggs sliding down the chutes 24 from the multiple nests might have a tendency to slide across the two fingers 18 of a flight and fall to the floor. Also the inner retaining wall 26 has to be lower so as to meet or slide under the egg chutes 24. And lastly there is no inner retaining wall to the trough 11 as shown in FIG. 5, and as previously explained, because the wire rope 19 has to enter the grooves 20 of the means 10 employed to move the rope along the trough.

FIG. 8 is another modified form of construction of the egg conveyor of this invention in which angle irons 27 and 28 serve as solid tracks for the wire rope 19 to ride on at the inside of the conveyor and for the cross-pieces 21 to ride on at the outside of the conveyor. A higher retaining wall 29 can be attached to the outside angle iron if necessary. The area between the angle irons 27 and 28 can be spanned by metal screening 30 which would permit chicken house dirt and dust to fall through to the floor.

It is within the scope of this invention to provide multiple holes in the bottom surface 23 of trough 11 so as to facilitate cleaning the trough, or the bottom 23 could be like 30 made out of expanded metal screening so as to be self-cleaning to a degree.

It is within the scope of this invention to use a gear wheel as moving means 10 that revolves in a vertical plane instead of a horizontal plane as shown in the drawing. The driving mechanism could also revolve at an angle instead of horizontally or vertically.

Another variation within the scope of this invention would be to have multiple nests arranged in tiers along one wall of the chicken house. In that case the egg conveyor would move along in front of the row of nests in the lower tier, pass beyond the nests and then make gradually declining circles so as to reach a level below the bottom tier of nests without tilting down too fast and causing the eggs to roll off the various flights. From the floor level the conveyor will pass under the bottom tier of nests to the other end of the nests away from the aforesaid declining circles. There the eggs would be removed from the conveyor and the wire rope would be squeezed in the groove of a vertical gear wheel and moved in a vertical circle. From the top of the vertical gear the wire rope would lay over by tilting the gear wheel a little from the vertical so that the fingers would point toward the nests as the conveyor slides along in its trough in front of the upper tier of multiple nests. Such an arrangement would utilize the egg conveyor of this invention in front of multiple tiers of multiple nests instead of passing in front of multiple nests set back-to-back as shown in the drawing.

The fingers of the flights could be made of tough wire, plastic coated wire, or be made out of wood or just plastic material. The wire rope could be cable, tough rope, or any other resilient flexible but sturdy and tough material so as to stand bending and wear sliding along the trough or track of the conveyor.

What I claim:

1. An egg conveyor comprising a trough adapted to be positioned in front of multiple nests, means within said trough for holding and carrying eggs, said means being fixedly attached to rope-like means lying in said trough on side nearest said nests, said trough including first and second longitudinally extending and laterally spaced apart support portions, one end of said means being slidably mounted upon said first support portion and the other end of said means being slidably mounted upon the second support portion and means for causing said rope-like means to move along said trough.

2. An egg-conveyor consisting of straight and curved sections of a trough, said straight sections being positioned so as to pass in front of multiple nests, means within said trough for holding and carrying eggs up off the bottom of said trough, said means being securely attached to rope-like means lying inside said trough on the side nearest said nests, said trough including first and second longitudinally extending and laterally spaced apart support portions, one end of said means being slidably mounted upon said first support portion and the other end of said means being slidably mounted upon the second support portion and circular means for moving said rope-like means along said curved and straight sections of said trough.

3. Apparatus for collecting and conveying freshly-laid eggs consisting of a trough having both straight and curved sections, said straight sections of said trough being adapted to be positioned in front of multiple nests and below the level where eggs are discharged from said nests, one of the said curved sections of trough partly encircling a circular means for moving a conveyor along in said trough, said conveyor comprising a series of identical and parallel fingers which extend cross-wise in said trough and a wire rope extending the full length of said trough along the side nearest the nests and said circular means, said parallel fingers being clamped at one end to said wire rope, and successive pairs of said fingers being joined at their other ends to each other by a cross piece of the same construction as said fingers.

4. An egg conveyor for collecting and conveying eggs comprising a trough adapted to be positioned in front of multiple nests, a series of multiple parallel fingers extending crosswise within said trough, said parallel fingers having down-turned hooks at one end which are adapted to envelop and be clamped to a wire rope, said parallel fingers having down-turned extremities at the other end, each successive pair of which are connected by a cross piece, driving means to move said wire rope along said trough, said hooks being slidably supported upon one side of said trough and said turned down extremities being slidably supported upon the other side of said trough.

5. An egg conveyor for collecting and conveying eggs comprising a trough adapted to be positioned in front of multiple nests and below the level where freshly laid eggs are discharged from said nests, means within said trough that collects and carries said discharged eggs, said means including multiple parallel fingers extending crosswise in said trough and a wire rope lying in said trough along the side near the nest, each of said fingers being fixedly fastened about the top side of said wire rope, and each successive pair of said fingers being joined at their extremities opposite the ends attached to said wire rope by cross pieces of the same construction as said fingers but below the level of said multiple fingers, circular means apart from said nests for moving said means within said trough, said trough including a support portion on one side thereof for supporting said extremities and a support portion on the other side thereof for supporting the ends of said fingers opposite said extremities.

References Cited in the file of this patent
UNITED STATES PATENTS

| | | |
|---|---|---|
| 2,710,682 | Coll | June 14, 1955 |
| 2,745,379 | Schmidt | May 15, 1956 |
| 2,870,902 | Rada et al. | Jan. 27, 1959 |
| 2,886,173 | Scott | May 12, 1959 |